Oct. 20, 1964   P. A. MANOR ETAL   3,153,317
FLUID PRESSURE VALVE OPERATING APPARATUS
Filed Dec. 19, 1960   4 Sheets-Sheet 4
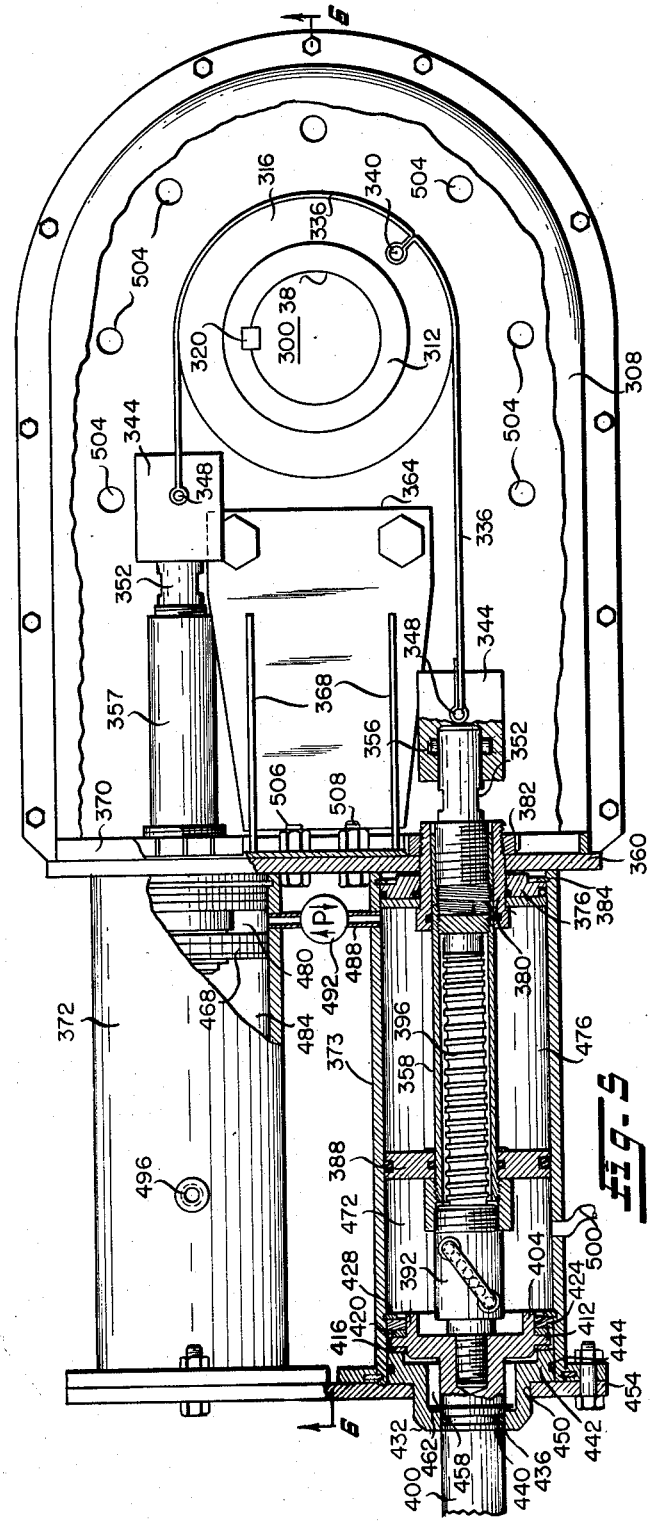
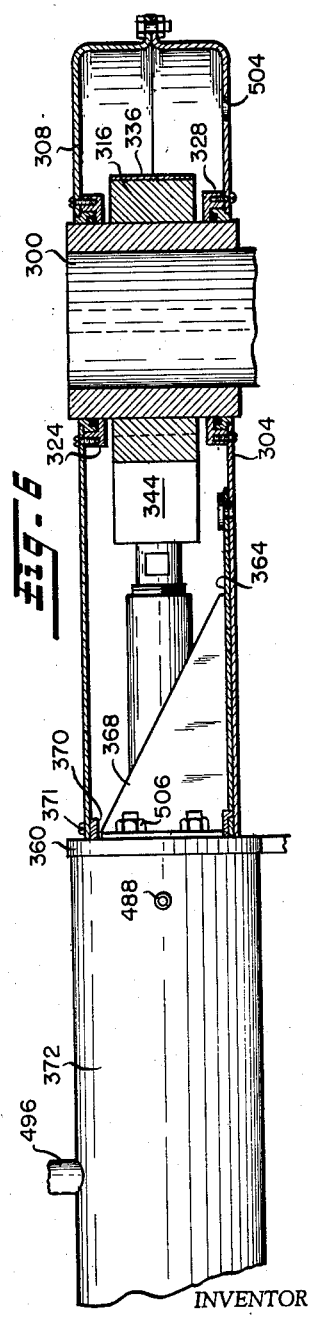
INVENTORS
Paul A. Manor
Gustav Kania
ATTORNEYS

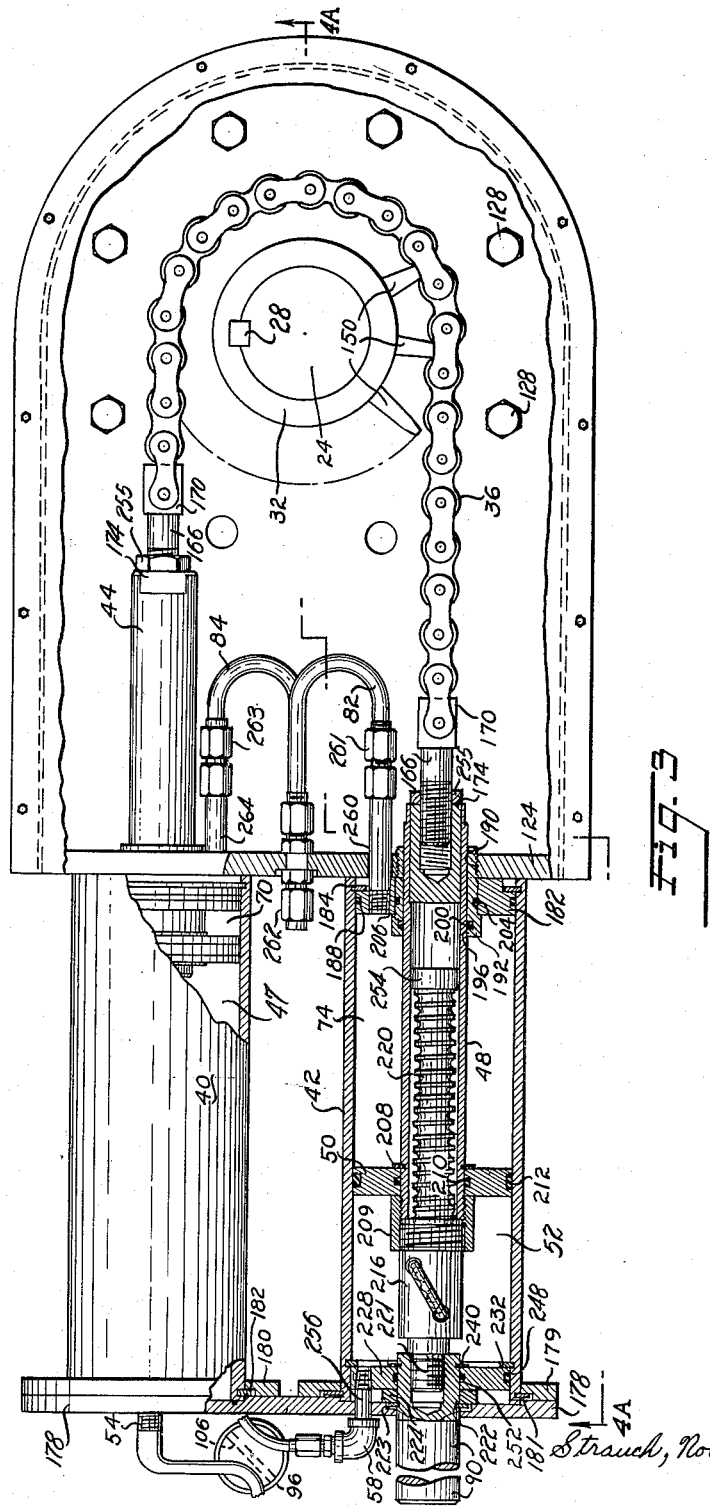

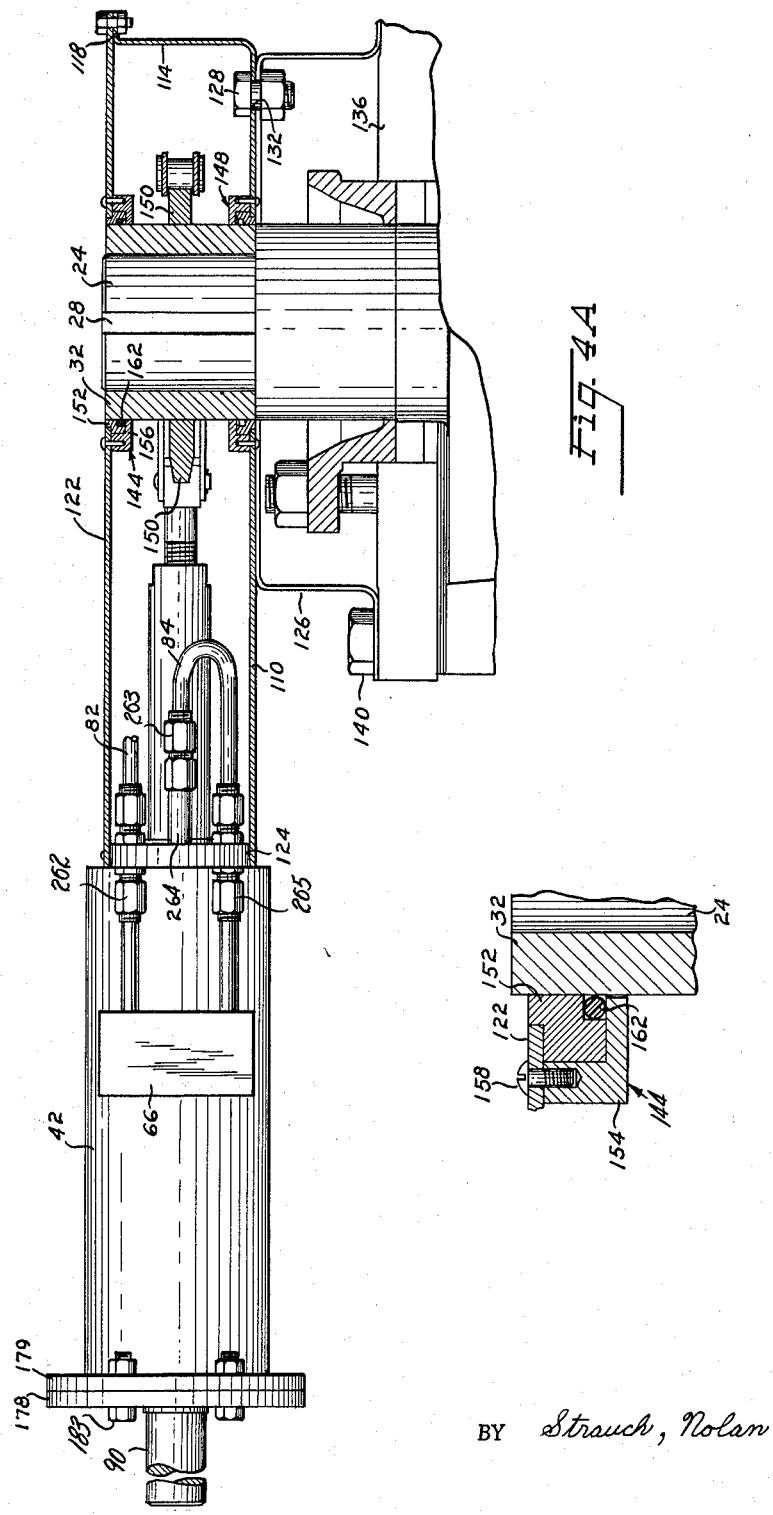

3,153,317
FLUID PRESSURE VALVE OPERATING APPARATUS

Paul A. Manor and Gustav Kania, Pittsburgh, Pa., assignors to Rockwell Manufacturing Company, Pittsburgh, Pa., a corporation of Pennsylvania
Filed Dec. 19, 1960, Ser. No. 76,957
8 Claims. (Cl. 60—6)

This invention relates to fluid pressure differential responsive valve operating apparatus and more particularly, although not exclusively, to special fluid pressure motor operators for opening and closing valves having rotatable tapered, cylindrical, ball and the like ported plugs.

Several important factors, including internal stresses and sealing, must be considered in relation to the rotatable opening and closing of plug type valves in which the operator usually is connected directly to the plug actuating mechanism. For example, these factors arise in plug valves used in high pressure systems which reach considerable size and as line pressures and sizes increase, seating engagement pressures between the valve plug and seat increase and it is necessary to assure proper fit between the plug and valve casing and between the plug stem and the casing.

Fluid pressure motor operated plug valves prior to this invention have mainly used double acting fluid motor operators with a single gear rack engaging a spur gear secured to the rotatable plug stem. In such a single rack system, coaction between the gear rack and the spur gear teeth create two components of side thrust normal to the axis of the valve stem which results in bending stresses being set up in the stem. To overcome this bending stress deficiency it has been proposed to employ a four piston type operator employing parallel opposed racks to rotate the valve plug. However, this arrangement requires expensive apparatus such as a special enclosed and sealed lubricant box for the pinion and special rack guides, exhibits inherent mechanical difficulties arising from the use of racks and a pinion, and objectionable difficulties exist in keeping the meshing racks and pinion properly lubricated.

The present invention dispenses with rack and gear operation and provides two parallel fluid pressure actuated motors connected by a flexible motion transmitting member or members to the valve plug stem. The fluid pressure responsive motor elements such as pistons may be selectively powered manually, by a pump in a closed hydraulic system, or by fluid pressure as from the line being valved for example. The primary source of power may be selected as desired according to the best available means for operating the valve under certain conditions while at the same time the other sources of power, the manual operation in particular, may be available in an emergency.

Line fluid pressure is a convenient source of power and the amount of fluid used in operating the apparatus is negligible. If, however, line pressures are subject to change undesirably, or if the line fluid should deleteriously affect the valve operating apparatus, a suitable motor operating pump may be employed in a closed hydraulic system that is separate from the line being valved. The pump can be programmed to open and close the valve at predetermined times.

The advantages of the apparatus disclosed for the preferred embodiment of the present invention are obtained without producing undue bending stresses in the valve stem. This is accomplished in part by connecting the flexible motion transmitting member of the present invention to the valve stem in such a manner as to minimize the bending moment in the stem. The bending stresses are further resisted by utilizing suitable bearing members which will be described in detail hereinafter.

Other advantages of the present invention are, for example, the improved ease of manual operation of a valve which is obtained from a novel worm-gear-piston arrangement, the compactness of design of the present apparatus requiring little operating space, ease of adapting the apparatus to any valve stem, that the operating mechanism will not be damaged if for any reason the valve member is restrained from being actuated through its normal path of travel, and that the various power sources adapted to operate the present valve operating system do not necessarily require disconnection or adjustment when switching from one to the other.

The primary object of the present invention is to provide a valve actuator embodying a novel power operated flexible connection to the valve stem, such as a flexible strap, belt or chain.

Another object of the present invention is to provide a valve operating system operative by a plurality of power sources easily switched from one to the other.

It is a further object of the invention to provide a novel valve operator wherein the valve stem is turned in either direction by a motorized flexible strap or chain connection to the valve stem.

Another object of the present invention is to provide a novel valve operating system utilizing a pair of oppositely acting fluid pressure motors selectively operable by manual control, line fluid pressure, or by pressure produced from a third source of power.

A further object of the present invention is to provide a compact valve operating system producing negligible bending stresses on the valve stem.

Still another object of the present invention is to provide a valve operating system employing a pair of oppositely acting fluid pressure motors and a substantially non-compressible pressure transmitting medium whereby movement of either pressure responsive motor element by forces produced from one of a plurality of power sources available to the motors is transmitted to the other through the pressure transmitting medium.

Further objects and advantages of the present invention will become apparent to those skilled in this art from the appended claims, the following description, and accompanying drawings wherein:

FIGURE 3 is a plan view, parts broken away and shown in section of a preferred embodiment of the strip operator system of the present invention;

FIGURE 4a is a cross sectional elevation view taken along line 4a—4a of FIGURE 3;

FIGURE 4b is an enlarged view of a bearing member shown in FIGURE 4a;

FIGURE 5 is a plan view, parts broken away and shown in section of a valve operator according to another embodiment of the present invention; and FIGURE 6 is a cross sectional elevation view taken along line 6—6 of FIGURE 5.

Figure 1:
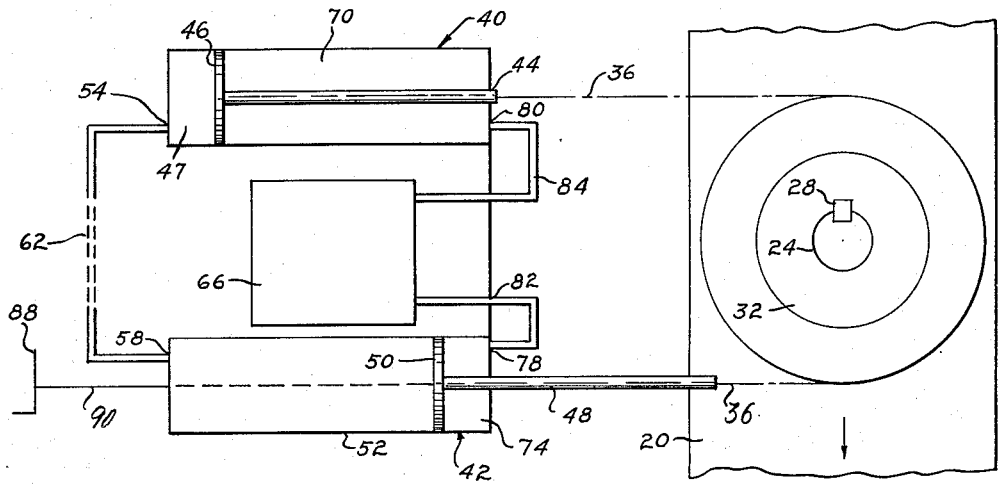
FIGURE 1 is a diagrammatic illustration of the valve operating system of the present invention as adapted to operate in response to pressure generated by a hydraulic pumping unit.
Figure 2:
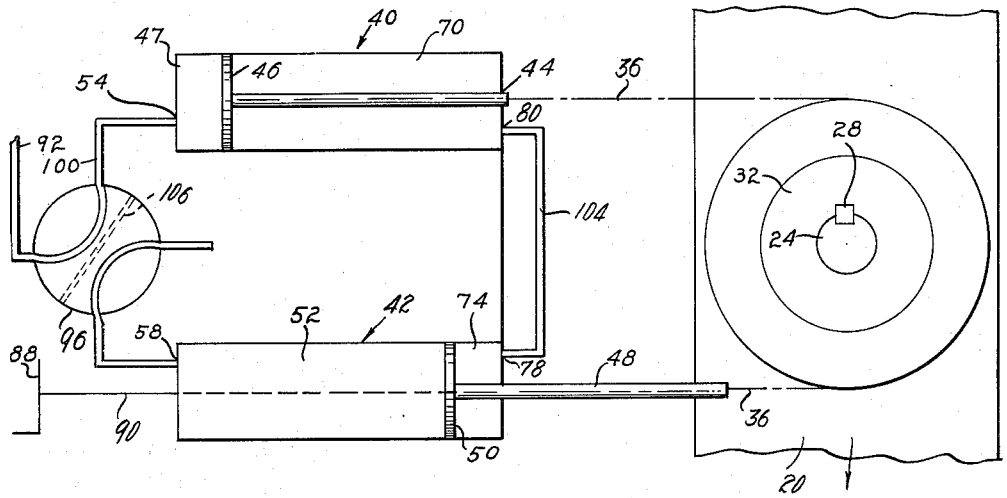
FIGURE 2 is a diagrammatic illustration of the valve operating system of the present invention as adapted to operate in response to pressure generated by a pneumatic pressure source such as line pressure.

Referring now to the drawings wherein like numerals have been used to designate like parts throughout, FIGURES 1 and 2 illustrate diagrammatically how the operating system of the present invention is adapted to operate in response to pressure created manually, by a hydraulic pressure source, or by a pneumatic pressure source.

In the hydraulically operated system of FIGURE 1, a flow line 20 has a valve located therein having a rotatable valve stem 24. Secured to the valve stem as by key 28 is a sprocket hub or pulley 32 which transmits the motion of a flexible operator strip 36 to the valve stem. As will be hereinafter described, the strip is preferably a chain or steel strap.

Flexible strip 36 is operated by two pressure responsive piston type motors having cylindrical walls 40 and 42 respectively, and is connected at each of its ends to piston rods 44, 48 of pistons 46, 50 respectively. The upper or left hand chambers 47, 52 of cylinders 40 and 42 as viewed in FIGURES 1 and 2 are connected with atmosphere through port fittings 54, 58 or placed in communication with each other by conduit 62. The latter is preferred to prevent foreign matter such as dirt or water from entering the cylinders by minimizing the number of air changes during reversals of the movement of pistons 46, 50.

A hydraulic pumping unit 66 comprising a hydraulic pump and a source of power coupled to the pump is connected in fluid communication with the right hand chambers 70 and 74 of cylinders 40 and 42 respectively through nipples 78 and 80, extending through openings in the end wall of the cylinders, by means of conduits 82 and 84. The hydraulic unit 66 must be reversible, or is alternatively adapted to be reversed by incorporating a reversing valve therein. It is clear that hydraulic unit 66 may be of any suitable conventional reversible type pump unit. The closed hydraulic system including hydraulic unit 66, chambers 70, 74 and conduits 82, 84 is filled with a substantially non-compressible pressure transmitting fluid such as oil and strip 36 is actuated by displacing the fluid from one cylinder to the other to selectively operate pistons 46, 50.

As hydraulic fluid is pumped from one cylinder (cylinder 42, for example) into cylinder 40 the hydraulic pressure on piston 46 forces it to the back of cylinder 40 pulling piston rod 44 and the attached flexible strip 36 to effect rotation of valve stem 24. When it is desired to rotate valve stem 24 in the opposite direction hydraulic pressure is reversed building up pressure in cylinder chamber 74, forcing piston 50 in the opposite direction with it.

The system shown in FIGURE 1 may also be operated manually by rotating hand wheel 88 on shaft 90 which is connected to piston 50 through a Saginaw nut and gear arrangement or the like (not shown). The Saginaw connection is such that rotation of handwheel 88 in one direction will effect displacement of piston 50 to the right thus forcing fluid into cylinder 40 and pushing on piston 46 which pulls strip 36, while rotation in the opposite direction results in positive mechanical displacement of piston 50 to the left thus pulling rod 48 and strip 36 and effecting clockwise valve stem rotation. Where high hydraulic pressures are employed, or where it is anticipated that too much resistance in the system to flow of the non-compressible fluid will be encountered to permit reasonably easy hand operation the fluid may be moved from one cylinder to the other through a bypass conduit which avoids hydraulic pumping unit 66.

In the system, as it is adapted to operate in response to pneumatic pressure shown in FIGURE 2, a high pressure inlet 92 connected to the upstream side of line 20 for example, is connected by a multiple valve 96 to the cylinder that is to have part or all of its hydraulic fluid evacuated. In the exemplary state of the system shown in FIGURE 2 which is set for clockwise valve stem rotation cylinder chamber 70 is to be evacuated and chamber 47 is therefore connected through fitting 54, conduit 100 and valve 96 to the high pressure. Cylinder fluid chambers 70 and 74 are in fluid communication through conduit 104 which diagrammatically represents a fluid passage either through the hydraulic pumping unit 66 (not shown in FIGURE 2) or by-passing the unit.

Clockwise movement of stem 24 as shown in FIGURE 2 is accomplished as the inlet pressure forces gas into cylinder 40 pushing piston 46 against the hydraulic fluid located in cylinder chamber 70, thus transmitting the pressure through the system fluid to piston 50 which moves to the left pulling operator strip 36. During pneumatic pressure operation handwheel 88 will "free-wheel" and offer negligible operation resistance.

The operator system of the present invention is set up so that the flexible operator strip will be pulled, as opposed to pushed, in the direction in which rotation of valve stem 24 is desired. The flexible strip will not operate if merely pushed.

In the case of manual operation of the system, the same sequence applies as in hydraulic operation. Multiple valve 96 is turned to effect fluid communication between cylinder chambers 47, 52 as through valve port 106, or to any other setting which will preclude the human operator from working against the pneumatic pressure, and handwheel 88 is then operated. As the handwheel is rotated, piston 50 is pulled towards or pushed away from the handwheel. In the latter case the manual operation acts as a hydraulic pumping system forcing the non-compressible fluid from cylinder 42 into cylinder 40.

The manual operator is located on the side of strip 36 that will pull the strip to close the valve, of which valve stem 24 is a part, in the event of a hydraulic failure of any kind or when manual operation is otherwise desirable. Thus, in the system shown in FIGURES 1 and 2, clockwise rotation of valve stem 24 would effect valve closure. The location of the manual operating mechanism as described has the advantage of providing for manual valve closure completely free of hydraulic or pneumatic assistance which is obviously desirable when a hydraulic or pneumatic failure has occurred.

Having briefly described the principles of operation of the present invention, reference is made to FIGURES 3, 4A and 4B for description of a preferred structural embodiment utilizing a chain operator strip 36. During this time chamber 52 exhausts through valve 96.

The apparatus shown in FIGURES 3, 4A and 4B is comprised of a chain and sprocket sub-assembly and a chain actuating mechanism including motors 40 and 42. The chain and sprocket assembly is housed in a bottom housing member 110 which has upturned sides 114 flanged as at 118 for receiving a top cover member 122. Both housing member 110 and cover 122 are secured at their ends nearest motors 40, 42 to a wall 124 which serves as a common mounting base for motors 40, 42 as well. The operator housing is conveniently secured to a valve by a valve adapter 126 bolted to housing 110 by bolts 128 extending through bolt holes 132. The adapter, which is built for the particular size valve to be accommodated, is in turn attached to the valve body 136 by bolts 140.

Valve stem 24 is associated with the operator apparatus by extending through housing 110 and cover 122 and through sprocket hub 32 which fits closely about stem 24 and is keyed thereto by key 28.

Hub 32 is journalled in bearings 144, 148 which are fixed to the top and bottom housing members respectively. The main hollow cylindrical body portion of hub 32 which engages valve stem 24 has fixed teeth 150 extending radially from the middle thereof which mesh with chain 36. Since the operating forces are applied over a relatively short portion of valve stem 24 and between bearings 144, 148 which act against the stem in opposition to bending thereof, bending stresses which the operating force would have a tendency to create are minimized to the extent that they are negligible.

Any suitable bearings may be employed on opposite ends of hub 32, however, preferred bearings are as shown in detail in FIGURE 4b utilizing a Z-shaped bearing member 152 held to an L-shaped bearing member 154 by bolt 158 and having an O-ring 162 disposed between the two bearing members for sealing.

Chain 36 is secured at each end to hollow piston rods 44, 48 by an adjustable screw 166 with clevis head 170. Each adjustable screw has a threaded end portion which is received in an internally threaded plug 174 fixed in the end of each piston rod. Rotation of the adjustable screw permits variations in the length of chain 36 to take up slack or for easy removal of the chain for replacement or dismantling purposes.

The actuating assembly of the operator apparatus is comprised essentially of the two pressure responsive motors 40, 42 each secured at one end to wall 124 and secured together at their other ends to maintain the relative positions by bracket 178 which receives the cylinder ends in recessed portions and is secured to the cylinders by bracket retainer plates 179, 180, retainer rings 181, 182 and bolts 183.

Cylindrical motors 40 and 42 are substantially alike with the exception that motor 42 is here adapted for manual, as well as pneumatic and hydraulic actuation. It will therefore be understood that description of motor 42 necessarily encompasses a description of motor 40, and further includes a description of the novel manual valve operating mechanism of the present invention.

Cylinder 42 abuts wall 124 and bracket 178 at its opposite ends, and encloses piston 50 which separates the cylinder into chambers 52 and 74. The end of cylinder 42 which abuts wall 124 is closed by apertured front cap plate 182 secured in cylinder 42 by any suitable means such as retainer ring 184. The motor is made fluid tight by sealingly engaging its various ports to prevent loss of non-compressible fluid contained therein, and loss of pneumatic pressure when applied. The sealing engagement of plate 182 with cylinder 42 is made fluid tight by the inclusion of a conventional sealing ring 188.

Extending through the center of plate 182 and through a threaded opening 190 in wall 124 is a bearing 192 which provides a fixed slide bearing at 196 for piston rod 48 and a circumferential shoulder 206 contacting cap plate 182 and urging it into tight engagement with ring 184. O-rings, or sealing rings, 200, 204 are provided in bearing 192 to insure fluid tight engagement with the piston rod and with plate 182.

Annular piston 50 is axially fixed on hollow piston rod 48 as by a snap ring retainer 208 and internally threaded piston rod coupling 209 which holds the piston against ring 208. The piston also has sealing rings 210, 212 on its inner and outer walls to provide a fluid tight seal between chambers 52 and 74.

A Saginaw-type nut 216 having an exterior threaded end is non-rotatably fixed in internally threaded piston rod coupling 209 and is adapted to cooperate with a Saginaw screw or worm member 220 which extends from shaft 90 substantially concentrically into hollow rod 48. Worm 220 has an end section threaded into and non-rotatably fixed with respect to shaft 90 at 221. Thus, the worm forms a rigid extension of rotatable shaft 90 which is held in cylinder 42 against longitudinal movement. Shaft 90 is journalled for rotation in the end of cylinder 42 in an opening in bracket 178 and in the central opening of annular closure plate 228. The Saginaw nut offers relatively slight frictional resistance to the rotation of shaft 90 and worm 220 primarily due to the ball bearing elements contained therein (as shown in dotted lines) which travel in the worm grooves. A retainer ring 222 resides in recess 223 of bracket 178 and is secured in a peripheral groove on shaft 90 and is adapted to limit longitudinal movement of shaft 90 by engaging a thrust bearing assembly 224 interposed between bracket 178 and closure plate 228. The bearing assembly consists of a bearing having race members (not shown) on opposite sides thereof and permits free rotation of shaft 90. Plate 228 is held in cylinder 42 against axial displacement toward piston 50 by retainer ring 232 fixed in the inner wall of the cylinder. Shaft 90 is held against appreciable axial movement in the other direction by retainer rings 240 which bears against closure plate 228. A fluid tight closure of cylinder 42 is effected by a pair of sealing rings 248, 252 on the inner and outer edge surfaces of plate 228.

To manually operate the valve operator apparatus it will be apparent from the foregoing that upon rotation of handwheel 88 and shaft 90, rotation of worm 220 will be effected and since Saginaw nut 216 is non-rotatably connected to piston rod 48, worm 220 will cause nut 216 to be longitudinally displaced in the cylinder according to the direction of its rotation. Longitudinal movement of piston 50 is limited in one direction when retainer 208 abuts the inner end of bearing 192 and in the other direction by the same action in cylinder 40. A stop member 254 is provided on the end of worm 220 for retaining the worm in nut 216. The stop member may be a metal ring or masking tape for example.

A lock nut 255 or the like is provided on each adjustment screw 166, which is then taken up against plug 174 fixed to the end of each piston rod 44, 48, to prevent rotation of the pistons and piston rods in their respective cylinders.

As shown in FIGURE 3, fittings 54 and 58 which extend to multiple valve 96 as shown in FIGURE 2 enter cylinders 40 and 42 through apertures in bracket 178. In the case of fitting 58, it is connected to a pipe nipple 256 which extends through closure plate 228 to provide access to the interior of cylinder chamber 52.

At the other end of cylinder 42, a pipe nipple 260 extends through plate 182 and an opening in wall 124 and is connected by coupling 261 with conduit 82 which curves back through wall 124 for connection with bulkhead fitting 262 fixed to wall 124 and reversible hydraulic unit 66 of FIGURE 1. Similarly, conduit 84 is connected by coupling 263 to nipple 264 which extends into cylinder 40 and curves back through wall 124 for connection with bulkhead 265 fitting fixed to wall 124 and hydraulic unit 66 as shown in FIGURE 4A. Alternatively conduits 82 and 84 may be directly connected as by the bypass 104 of FIGURE 2 in some embodiments not using the hydraulic pump unit 66.

The above described composite operator of FIGURES 3, 4A and 4B may thus be powered by a hydraulic operator alone as in FIGURE 1, or by pneumatic pressure acting through valve 96 as in FIGURE 2. When the operator is actuated by the hydraulic unit 66, the valve 96 is turned to connect chambers 47 and 52 through port 106. When the operator is actuated by pneumatic pressure the hydraulic circuit of chambers 70 and 74 includes the reversible hydraulic pump unit which passes the liquid or where the pump unit is not used a simple bypass conduit connects chambers 70 and 74. The valve stem 24 may be turned manually by rotating hand wheels 88 on shaft 90. The manual operation is itself a hydraulic operation in one direction of operation (counterclockwise as shown in FIGURE 3) since it pushes fluid from chamber 74 into cylinder 40 to exert pressure on, and effect movement of piston 46.

The manual operation is available with either hydraulic or pneumatic operation although the latter two are not necessarily cooperative. If a ruptured line or the like causes a hydraulic failure for example, the handwheel operation is preferably adapted to be in a direction of rotation to mechanically pull piston 50 towards it and effect valve closing clockwise rotation. Thus, a direct mechanical linkage from the handwheel and its shaft 90 through Saginaw nut 216 and piston rod 48, and then through adjustable screw 170, chain 36, and sprocket hub 32, enable the operator to pull the valve to a closed position without use of hydraulic or pneumatic assistance if necessary.

Another feature of the present invention is that more than ninety degrees of arc of valve stem rotation may be obtained in an economical and practical manner, although ninety degrees is suitable for most purposes and encompasses the most efficient and preferred operating range of the present invention. However, multiple valves for example, often require more than ninety degrees and a chain can be used through whatever arc is necesary.

Where greater operating torque is required, multiple sprockets and chains may be used, however, there is only one cylinder for each direction and the chains must act together. Also the cylinders may be designed to operate under various operating pressures as for example, where a special case arises and lower pressure operation is desired as in a plant where the operator is connected with the plant air system or in other like uses.

The above description made in connection with FIGURES 1 and 2 of the operation of the valve operator of the present invention is also applicable to the modified structure shown in FIGURES 5 and 6 since the latter operator system operates in substantially the same manner to pull an operator strip to rotate a valve stem in response to motor actuation by either manual, hydraulic, or pneumatic power sources, and differs only in the strip operator and in certain detailed respects in the motor structure.

In FIGURES 5 and 6 a valve stem 300 extends through bottom and top housing members 304, 308 and through closely fitting cylindrical pulley hub 312 and pulley 316. Hub 312 is secured against relative movement with respect to stem 300 by key 320 and is journalled at its opposite ends in bearings 324 and 328.

The operator strip is a flexible strap 336 (preferably of stainless steel) anchored to pulley 316 by a roll pin 340 to prevent strap slippage and hence, to provide positive pulley and valve stem actuation. At each of its ends strap 336 is secured to a clevis 344 by roll pins 348, which in turn non-rotatably holds an adjustable screw 352 by a pin such as 356, and the adjustable screw is threadably engaged with the internally threaded end portion of either piston rod 357 or 358. Variation of the effective length of strap 336, or disengagement thereof from the pistons, may therefore be accomplished by rotation of screws 352.

Housing member 304 is fixed to a wall member 360 by a right angle bracket 364 having triangular braces 368, and housing member 308 is secured to wall 360 by flange 370 which extends from wall 360 and is bolted at 371. To the other side of wall 360 motor cylinders 372 and 373 are secured by a cylinder plate 376, bearing 380, locknut 382 threaded on the bearing, and retainer ring 384, similarly as cylinders 40 and 42 are shown secured to plate 124 in FIGURE 3.

The assembly of piston 388, piston rod 358, Saginaw nut 392, worm 396 and shaft 400 is also substantially the same as for the corresponding components shown in FIGURE 3.

In the manual operating mechanism, the end of shaft 400 is flared outwardly to form a skirt 404 which has a peripheral flange 412 extending radially outwardly therefrom for engaging thrust bearings 416 and 420 located on opposite sides of the flange. Bearing 420 is held in engagement with flange 412 by an annular bearing retainer member 424 which in turn is secured in cylinder 373 by a snap-ring 428 fitted in a groove on the inside of cylinder 373. Cylinder 373 is closed at its rearward end by retainer member 432 which has a center opening 436 rotatably receiving shaft 400 and which is sealed by O-ring 440. Retainer member 432 has an outwardly flared skirt portion which terminates in an annular downturned rim 442 sealed with cylinder 373 by an O-ring 444 which serves to hold bearing 416 in engagement with flange 412 while end retainer member 432 (of which rim 442 is a part) is held in non-rotative position in opening 450 in end bracket 454.

A radial bearing 458 between end retainer 432 and shaft 400 which provides free aligned rotation of the shaft is held in position by a retainer ring 462 secured in a groove in the shaft 400.

Thus, axially between bracket 454 and ring 428, shaft 400 is rotatably mounted in cylinder 373, and restricted longitudinally against substantial movement.

Piston 388 divides cylinder 373 into chambers 472 and 476 while piston 468 similarly divides cylinder 372 into two chambers 480 and 484. A conduit 488 provides fluid communication between cylinder chambers 476 and 480 which are filled with non-compressible fluid and which, along with conduit 488, constitutes the closed hydraulic system of this embodiment of the present invention.

A reversible hydraulic pumping unit 492 similar to unit 66 indicated diagrammatically in FIGURE 1 is located along conduit 488.

Pneumatic pressure may be admitted into chambers 472, 484 by fittings 496 and 500 that are suitably connected by conduits with a multiple valve therein such as valve 96 of FIGURE 2 for the purpose of placing the two chambers in fluid communication with each other or selectively with a source of high pressure and atmosphere as the case may be, depending upon the direction of valve stem rotation desired and the source of power employed.

In general, the operator of FIGURES 5 and 6 operates the same as does the previously described embodiment by any of the disclosed sources of power.

As strap 336 is caused to move by the action of motors 372, 373 it tends to pull against stem 300 and develop bending stresses which are minimized by the present structure inasmuch as operator strap 336 and pulley 316 impart a substantially uniformly distributed load to stem 300 which substantially reduces the bending moment established in the stem as opposed to a direct concentrated load ordinarily applied by a rack and pinion for example. Also, bearings 324, 328 being spaced on opposite sides of the uniformly distributed load applied to stem 300 act as simple supports further reducing bending stresses developed in the stem by shortening the effective length of span over which the bending load is applied. Another independent feature of the present invention tending to reduce bending stresses in stem 300 to a negligible degree is the tubular hub portion 316 closely fitted around the valve stem over the full length of the stem located between bearings 324 and 328 which in effect affords additional load carrying support and increases the load carrying capacity of the stem by increasing its section modulus which is a basis for comparing the strengths of sections of different sizes and shapes.

The operator strap housing of this embodiment, as well as the embodiment shown in FIGURES 3, 4A and 4B is comprised of top and bottom housing members and an end wall such as 360, and is shallow and compact and provides protection for the contained parts of the operator apparatus and further provides openings 504 for conveniently receiving bolts for mounting the apparatus on a valve housing for example. Motors 372, 373 which are fixed on the side of cylinder plate opposite the strap housing are only slightly thicker than the housing, and the over-all appearance of the apparatus is therefore neat and compact, yet all the various parts are readily accessible by simple and expedient mechanical dismantling of a few elements. For example, cover 308 may be removed for access to strap 336 and associated parts, while end plate 360 may be removed to gain access to the interior of motor cylinders 372 and 373. Further, the motors are supported and held together at their other ends by bracket 454 and therefore are easily handled as a unit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An operator for a plug valve having a rotatable valve stem comprising a flexible motion transmitting means adapted to be operably connected with said valve stem to effect rotary movement thereof when displaced, and drive means comprising a pair of motors each having a cylinder separated by a piston into longitudinally spaced chambers, each of said pistons connected with an end of said motion transmitting means, and a closed hydraulic circuit comprising an end chamber of each motor directly connected by conduit means for transmitting the motion of displacement of one piston in its cylinder to corresponding opposite displacement of the piston in the other cylinder, a reversible pump in said conduit means operable for effecting displacement of one or the other of said pistons to rotate the valve stem between open and closed valve positions, and means for optionally effecting said displacement of said pistons comprising a reversible valve connected between a source of gas pressure and the other two of said motor chambers.

2. An operator as defined in claim 1 further comprising means in one of said motors for manually longitudinally displacing the piston therein for tensioning said flexible motion transmitting means in a direction adapted to rock said valve stem in a predetermined direction.

3. In an operator for a plug valve having a rotatable stem, two motor assemblies each having a cylinder separated by a slidable piston into longitudinally spaced chambers, means providing a closed hydraulic circuit between two of said chambers at corresponding ends of the respective cylinders, means for selectively introducing fluid under pressure into one or the other of the other two chambers, motion transmitting means connecting both of said pistons to said stem, and means directly operatively connected to one of said pistons for manual displacement thereof longitudinally in its respective cylinder.

4. An operator for a plug valve having a rotatable stem comprising a flexible motion transmitting means operably connected to said stem, a pair of fluid pressure motors each separated into two longitudinal chambers by a slidable piston therein, said pistons being operably connected to opposite ends of said motion transmitting means, said chambers on one of the corresponding ends of said motors connected by a conduit and filled with a motion transmitting liquid to comprise a closed hydraulic circuit, reversible pump means in said conduit for selectively forcing said liquid into one or the other of said chambers at said one end to selectively displace said pistons for oppositely rocking said valve stem, and means for optionally displacing said pistons for oppositely rocking said valve stem comprising reversible valve means connected to a source of gas under pressure for selectively introducing gas under pressure into one or the other of the other two chambers.

5. An operator for a plug valve having a rotatable valve stem comprising flexible motion transmitting means terminating in opposite ends and being adapted to be operably connected to said valve stem for effecting rotary movement thereof, and drive means comprising two fluid pressure motors having driven elements operably connected to respective ones of said opposite ends of said motion transmitting means, first means for hydraulically driving said elements to effect movement of said motion transmitting means in directions adapted to rock said valve stem between open and closed valve positions, second means operable alternatively with said first means for pneumatically driving said elements to effect movement of said motion transmitting means in directions adapted to rock said valve stem between open and closed valve positions, and manual means operatively connected to one of said elements to effectuate movement of said one element and said motion transmitting means in a direction adapted to rotate said valve stem to one of said valve positions.

6. An operator for a plug valve having a rotatable stem, said operator comprising an element adapted to be operably connected to said stem for transmitting rocking movement thereto, two fluid pressure actuated motors, conduit means establishing liquid intercommunication between corresponding ends of said motors, and flexible motion transmitting means operably connected between said element and each of said motors, manually actuatable means operably connected to one of said motors for displacing liquid therefrom into the other of said motors through said conduit means for oppositely driving said other motor to tension said motion transmiting means and effect rocking of said element.

7. In an operator for a plug valve having a rotatable stem, said operator comprising an element adapted to be operably connected to said stem to effect rocking of said stem between valve open and closed positions, two fluid pressure motor assemblies each having a cylinder separated by a slidable piston into longitudinally spaced chambers, means providing a closed hydraulic circuit directly between two of said chambers at corresponding ends of the respective cylinders, means for selectively introducing fluid under pressure to one or the other of the other two chambers to displace the pistons therein in a given direction, and means operatively connecting said pistons to said element to effect rocking of said element, said closed hydraulic circuit comprising a reversible pump whereby said pistons may be optionally hydraulically actuated by said pump.

8. The operator defined in claim 7 comprising manual means operatively connected to one of said pistons to effect rocking of said element in a direction operable to rotate said valve stem to one of said valve positions.

References Cited in the file of this patent

UNITED STATES PATENTS

| 135,024 | Widmer | Jan. 21, 1873 |
| 1,056,124 | Rorke | Mar. 18, 1913 |
| 2,239,893 | Jackman | Apr. 29, 1941 |
| 2,555,649 | Krotz | June 5, 1951 |
| 2,738,945 | Shafer | Mar. 20, 1956 |
| 2,954,011 | Krehbiel | Sept. 27, 1960 |
| 2,958,197 | Elliott | Nov. 1, 1960 |
| 3,056,573 | Matheson et al. | Oct. 2, 1962 |

FOREIGN PATENTS

| 772,667 | France | Aug. 18, 1934 |